US 9,789,643 B2

(12) United States Patent
Litzenberg et al.

(10) Patent No.: US 9,789,643 B2
(45) Date of Patent: Oct. 17, 2017

(54) DEVICE FOR BLOW MOLDING CONTAINERS

(71) Applicant: KHS Corpoplast GmbH, Hamburg (DE)

(72) Inventors: Michael Litzenberg, Geesthacht (DE); Rolf Baumgarte, Ahrensburg (DE); Margit Kiefer, Hamburg (DE); Frank Lewin, Tangstedt (DE); Michael Linke, Hamburg (DE)

(73) Assignee: KHS CORPOPLAST GMBH, Hamburg (DE)

( * ) Notice: Subject to any disclaimer, the term of this patent is extended or adjusted under 35 U.S.C. 154(b) by 46 days.

(21) Appl. No.: 14/903,527

(22) PCT Filed: Jul. 11, 2014

(86) PCT No.: PCT/EP2014/001907
§ 371 (c)(1),
(2) Date: Jan. 7, 2016

(87) PCT Pub. No.: WO2015/007378
PCT Pub. Date: Jan. 22, 2015

(65) Prior Publication Data
US 2016/0158993 A1 Jun. 9, 2016

(30) Foreign Application Priority Data

Jul. 19, 2013 (DE) .................... 10 2013 012 209

(51) Int. Cl.
*B29C 49/58* (2006.01)
*B29C 49/06* (2006.01)
(Continued)

(52) U.S. Cl.
CPC .............. *B29C 49/58* (2013.01); *B29C 49/06* (2013.01); *B29C 2049/4294* (2013.01);
(Continued)

(58) Field of Classification Search
CPC ............ B29C 49/58; B29C 2049/5803; B29C 2049/4294
See application file for complete search history.

(56) References Cited

U.S. PATENT DOCUMENTS 4,076,071 A  2/1978 Rosenkranz
5,346,386 A  9/1994 Albrecht et al.
(Continued)

FOREIGN PATENT DOCUMENTS

DE  2352926 A1  4/1975
DE  4212583 A1  10/1993
(Continued)

OTHER PUBLICATIONS

Partial machine translation of DE102007009026A1 (Litzenberg et al) dated Aug. 28, 2008 obtained from the espace website.*

*Primary Examiner* — Robert B Davis
(74) *Attorney, Agent, or Firm* — Lucas & Mercanti, LLP; Klaus P. Stoffel

(57) ABSTRACT

A device for blow molding containers. Preheated preforms made of a thermoplastic material are transferred within a blow molding machine to a blowing device. In the region of the blowing device, the preforms are shaped into containers by the blow molding by a blowing pressure. In the region of the device for blow molding containers, a blowing nozzle seal is arranged, which is brought against a support ring of the preform. The blowing nozzle seal is formed by a sealing element and a support sleeve. The blowing nozzle seal is first mechanically preloaded in relation to the support ring after contact with the support ring and then is further loaded pneumatically. An accommodating space that surrounds the mouth section of the preform is thereby provided, which accommodating space has substantially the same pressure as the interior of the preform in order to avoid deformation of the mouth section.

14 Claims, 4 Drawing Sheets

(51) Int. Cl.
 B29C 49/42 (2006.01)
 B29K 67/00 (2006.01)
 B29L 31/00 (2006.01)
(52) U.S. Cl.
 CPC  *B29C 2049/5803* (2013.01); *B29K 2067/003* (2013.01); *B29L 2031/7158* (2013.01)

(56) References Cited

U.S. PATENT DOCUMENTS

| | | | |
|---|---|---|---|
| 5,646,026 | A | 7/1997 | Walsh |
| 8,349,246 | B2 * | 1/2013 | Sperka ............. B29C 49/58 |
| | | | 264/522 |
| 9,364,991 | B2 * | 6/2016 | Duclos ............. B29C 49/58 |
| 2010/0151073 | A1 | 6/2010 | Daniel |
| 2012/0114783 | A1 | 5/2012 | Lambert |

FOREIGN PATENT DOCUMENTS

| | | | |
|---|---|---|---|
| DE | 4340291 | A1 | 6/1995 |
| DE | 19906438 | A1 | 8/2000 |
| DE | 102007009026 | A1 | 8/2008 |
| DE | 102008025775 | A1 | 12/2009 |
| EP | 2127851 | A1 | 12/2009 |
| WO | 2010113079 | A2 | 10/2010 |

* cited by examiner

DEVICE FOR BLOW MOLDING CONTAINERS

The present application is a 371 of International application PCT/EP2014/001907, filed Jul. 11, 2014, which claims priority of DE 10 2013 012 209.0, filed Jul. 19, 2013, the priority of these applications is hereby claimed and these applications are incorporated herein by reference.

BACKGROUND OF THE INVENTION

The invention pertains to a device for blow-molding containers comprising at least one blow-molding station for molding the preforms into containers.

The device according to the invention is applicable in particular as part of a method for blow-molding containers in which preforms consisting of a thermoplastic material are heated in the area of a heating section and then transferred to a blowing device, in which the preforms are molded inside the molds by the action of a blowing pressure. A preferred application involves blow-molding machines with a rotating blowing wheel.

During the molding of containers by the action of a blowing pressure, preforms of a thermoplastic material such as of PET (polyethylene terephthalate) are sent to different processing stations inside a blow-molding machine. A blow-molding machine of this kind typically comprises a heating device and a blowing device, in the area of which the previously tempered preform is expanded to form the container by biaxial orientation. The expansion takes place with the help of compressed air, which is introduced into the preform to be expanded. The technical processing steps involved in the expansion of the preform are explained in DE-OS 43 40 291. The previously mentioned introduction of the compressed gas comprises both the introduction of compressed gas into the preform at the start of the blowing process and the introduction of compressed gas into the developing container bubble.

The basic structure of a blowing station for molding containers is described in DE-OS 42 12 583. Possible ways of tempering the preforms are explained in DE-OS 23 52 926. A device of the class in question for the blow-molding of containers and the method required to produce these containers are disclosed in DE 10 2007 009 026 A1.

Inside the blow-molding device, the preforms and the blown containers can be transported by different types of handling mechanisms. The use of transport mandrels, onto which the preforms are set, has proven to be especially reliable. The preforms can also be handled by other types of transport mechanisms. The use of grippers to handle preforms and the use of spreading mandrels, which can be introduced into the mouth area of the preform to hold it, also belong to the available configurations.

The handling of containers by the use of transfer wheels is described in, for example, DE-OS 199 06 438; in this case, the transfer wheel is arranged between a blowing wheel and a discharge section.

The handling of preforms discussed above can proceed according to the so-called two-stage method, in which the preforms are first produced in an injection-molding process, then stored temporarily, and only later brought up to temperature and blown into containers. The preforms can also be handled by what is known as the one-stage method, according to which the preforms are tempered and blown immediately after the injection-molding step.

This means that the preforms can be either blow-molded directly from the first heat or tempered to adjust their temperature and then blow-molded. These situations are described in DE 10 2007 009 026 A1.

There are various known embodiments of the blow-molding stations which are commonly used. In the case of blow-molding stations which are arranged on rotating transport wheels (rotary table principle), it is often seen that the mold carriers can open up like a book. It is also possible, however, for mold carriers to be used which shift relative to each other or which are guided in some other way. In the case of stationary blow-molding stations, which are especially adapted to accommodating several cavities for container molding, plates arranged parallel to each other are typically used as mold carriers.

During the technical process of molding the preforms and thus during their transformation into containers, the interior space of the preforms is subjected to considerable internal pressure to implement the blow-molding process. During blow-molding, internal pressures of up to 40 bars are in play. It is undesirable, however, for the threaded area of the preforms to change its shape also, because otherwise the caps used to seal the containers would not fit properly.

To avoid undesirable deformation of this type, it is already known that the threaded area can be mechanically supported on the outside. An external seal for the preform is also known, which has the effect of making the pressure essentially equal on both sides of the threaded area. The threaded area of the preform is for this purpose typically surrounded by a compensating space, which is sealed off against a support ring of the preform. As a result, the blowing pressure acts on all sides of the threaded area, and thus a pressure gradient between the internal and external surfaces of the threaded area which would promote deformation is avoided.

When a seal against the support ring is provided, it is necessary to prevent damage to the support ring of the preform; in addition, a reliable seal must be guaranteed even when manufacturing tolerances occur; aging phenomena of the structural elements used and temperature-related expansions of the material must also be taken into account. DE 10 2007 009 026 A1 offers a device for dealing with this list of requirements.

Accordingly, what is realized is a support element in the area of the blowing device, which is moved against the support ring of the preform, and according to which the support element, after making contact with the support ring, is first pretightened mechanically against the support ring and then tightened even further pneumatically.

The sealing element for sealing the preform extends in the area of a compensating space surrounding a mouth section of the preform, proceeding from a stop of a connecting element toward an insertion opening of the connecting element, and comprises at least one concave area, which is oriented opposite a support surface of the stop element.

Because the area of the mouth section of the preform is sealed off by the use of the sealing element, it is possible to build up a pressure outside the mouth section which prevents the mouth section from being deformed during the blow-molding process. This is realized by the uniform pressure present all the way around the mouth section of the preform.

The mechanical pretightening of the sealing element provides sufficient leak-tightness to permit the further pneumatic tightening of the seal in a second method step. The pneumatic tightening makes it possible in particular to increase the seal-producing tightness of the sealing element as the pressure against which the seal is to be produced increases.

The disadvantage of this known device is that, to realize the sealing arrangement inside the blow-molding device, the blowing nozzle must have a large diameter. As a result of the considerable amount of space which is therefore taken up and because several blow-molding stations are arranged simultaneously on the blowing device a predetermined distance apart, it is often no longer possible for gripping mechanisms for handling the preforms or the blown containers to be moved into position in the area of the preforms or containers in every position of the blow-molding stations.

Another disadvantage of this known device is that, because of the pneumatic tightening and as a result of the distance by which the sealing element extends in the direction opposite to the connecting element, it is possible for relative movement to occur between the sealing element and the concentric cylindrical surface of the mouth section supporting the sealing element.

Especially because there is great deal of static and dynamic friction between the material of the sealing element and the material of the cylindrical surface selected here, there is the danger that the remaining axial force acting on the concentric sealing surface is not sufficient to generate the two-dimensional pressure on the sealing seat necessary for a reliable sealing effect.

SUMMARY OF THE INVENTION

The goal of the present invention is to improve a device of the type described above in such a way that, in spite of its simple design and high operational reliability, the amount of space occupied by the blowing nozzle is reduced and the reliability of the seal between the device and the preform or container is promoted.

This goal is achieved according to the invention in that a sealing element for sealing the preform extends in the area of a compensating space surrounding the mouth section of the preform, proceeding from a stop of a connecting element toward an insertion opening of the connecting element; in that the sealing element comprises at least one concave area, which is oriented opposite a support surface of the connecting element; and in that the sealing element is surrounded by a support sleeve, which can move inside the blowing nozzle.

Through the use of a blowing nozzle seal consisting of a sealing element with a surrounding support sleeve, which are jointly pretightened mechanically and then tightened further pneumatically, it is possible to seal the preform in a low-stress but also extremely reliable manner.

The support sleeve is configured in particular to be rigid so that it can effectively support the sealing element. This means that, by reason of the invention, not only rigid but also flexible sealing elements can be used, which are not dimensionally stable on their own or not dimensionally stable enough to serve the desired sealing function in the selected individual case.

The support sleeve surrounding the sealing element makes it possible for the receiving means for the mouth of the preform or container and the blowing nozzle seal to be constructed to project axially out of the blowing nozzle, which makes it possible in turn to decrease the amount of space which is occupied and thus to move grippers between the blowing nozzles of adjacent blowing stations no matter what position the blowing nozzles may be in.

A defined deformation of the sealing element during the pretightening step is achieved in that a concave area of the sealing element becomes increasingly deformed, i.e., increasingly more concave, during the pretightening process. The end surface of the sealing lip of the sealing element rests on the blowing nozzle insert and/or is supported against it.

A simple way to produce the additional tightening force is to allow the blowing gas to exert pressure on the concavity to tighten it further, as a result of which the concavity expands. The support sleeve according to the invention then effectively prevents undesirable deformations or evasive movements of the sealing element, so that compressive forces introduced into the sealing element via the concavity subject the blowing nozzle seal to the optimal additional tension.

The support sleeve is preferably arranged inside the blowing nozzle head in axially movable fashion. For example, the concavity of the sealing element is arranged axially between the support sleeve and the blowing nozzle head to achieve the previously described mechanical and pneumatic pretightening and additional tightening of the blowing nozzle seal.

The combination according to the invention of sealing element and support sleeve is especially effective at compensating for tolerances in the longitudinal direction of the arrangement. These tolerances can pertain, for example, to the thickness of the support ring of the preforms or to the geometric arrangement of the blowing nozzle relative to the blow mold. A maximum extension of the combination of sealing sleeve and support sleeve from the blowing nozzle is defined by a mechanical stop between the support sleeve and the surrounding wall of the blowing nozzle.

Because of the profiled contour of the sealing sleeve, similar to a section of a bellows, a certain inward deflection is possible. This possibility of a defined inward deflection supports the ability to compensate for tolerances.

For the performance of the sealing process, it is has proven to be especially advantageous that the pressure within the concavity converts the transverse force into a longitudinal force, which tightens the sealing element. Thanks to the teaching of the invention, according to which a support sleeve is provided as a movable element inside the blowing nozzle, it is possible, through the appropriate choice of materials, to reduce the static and dynamic friction, which can negatively affect the strength of the longitudinal force. The use of a support sleeve as a component surrounding the sealing element prevents the sealing element from moving relative to a component of the blowing nozzle. It is advantageous to choose, for example, materials of a similar type such as metal-metal or plastic-plastic.

The use of composite materials or of lubricant particles embedded in a base matrix is especially recommended. The use of different materials such as plastic for the sealing element and metal for the support element is also conceivable. As a rule, the sealing element will be made of an elastomeric material.

Another advantage of the teaching according to the invention is that the combination of sealing element and support sleeve allows length deviations of the individual elements of the blowing nozzle, the support sleeve, and the shoulder area of the support ring of the preform or container in the axial direction resulting from manufacturing tolerances to be compensated more-or-less automatically. The shape of the sealing element and the concavity at one end also support longer stretching distances. In addition, the shape of the concavity allows the concave area of the sealing element to be compressed, which again promotes the ability to compensate for length tolerances. The support sleeve is preferably equipped with a terminal collar, the shoulder of which cooperates with a projection of the blowing nozzle in such a way that the axial dimension of the blowing nozzle seal is limited.

A build-up of opposing forces, i.e., a pressure acting on the external surface of the sealing element concavity as a result of deformation, is avoided by the loose fit between the support sleeve and the blowing nozzle, which allows the cavity between the concavity and the external element to be vented in particular to the surrounding space during the deformation of the concavity.

The provision of a concentric receiving space for the mouth of the preform or container inside the blowing nozzle is achieved by centering and guide elements for the blowing nozzle seal and the blowing nozzle insert. This concentric receiving space promotes the uniform distribution of the pressure on the threaded area of the preform.

Use can be made of the blowing air to deform the sealing element and to realize the uniform pressure distribution on the threaded area of the preform by connecting the receiving space to an interior space of the connecting element by at least one connecting channel.

The device according to the invention is illustrated schematically in the drawings:

DETAILED DESCRIPTION OF THE INVENTION

Figure 1:
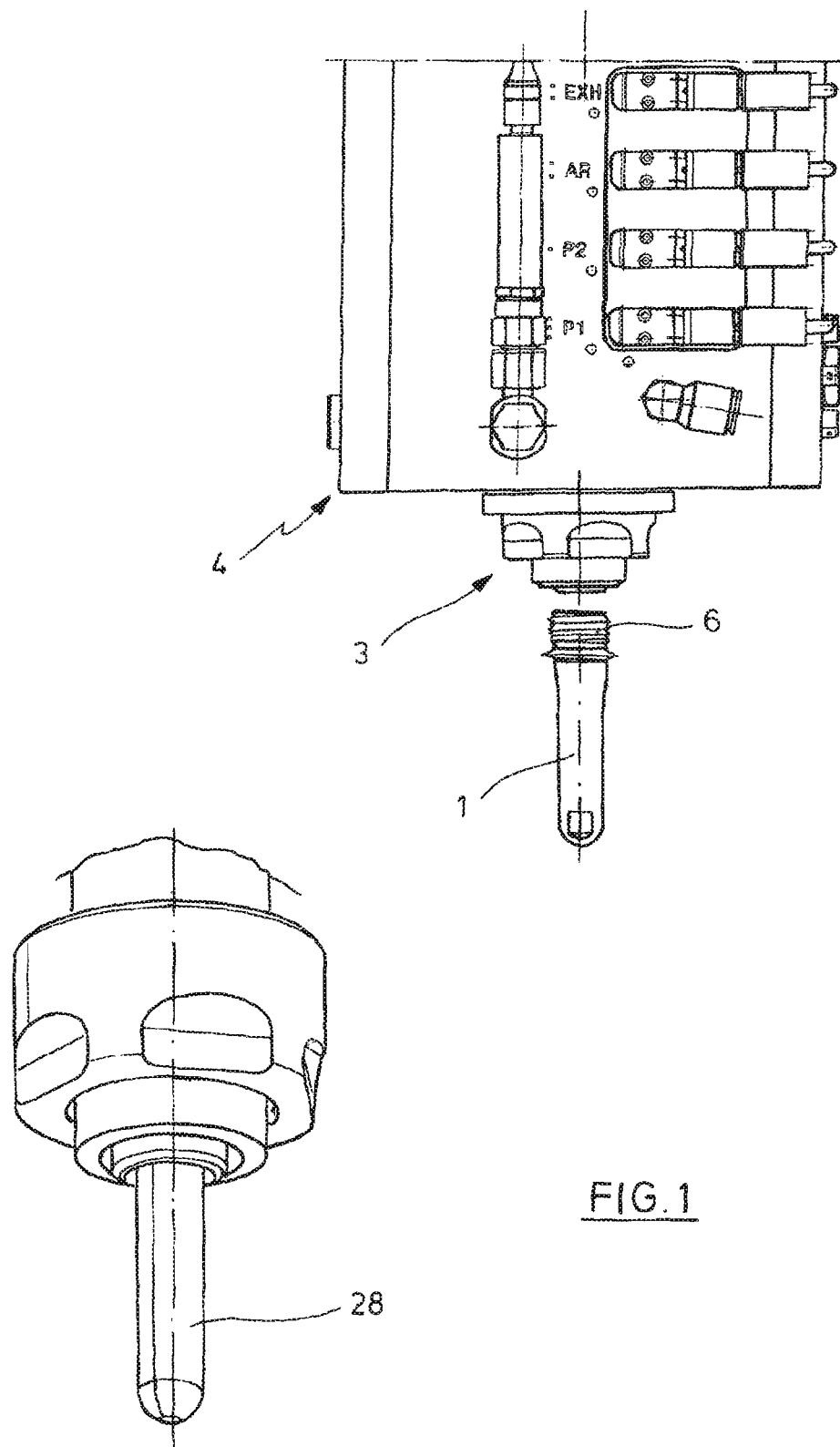
FIG. 1 shows a perspective diagram of a blow-molding station with the device for blow-molding containers from preforms, wherein the preform is positioned at a valve block in an axial orientation suitable for the insertion of the preform.

FIG. 1 shows the device 3 for blow-molding containers 2 mounted on a blowing air control block 4, which is configured as a valve block.

Figure 2:
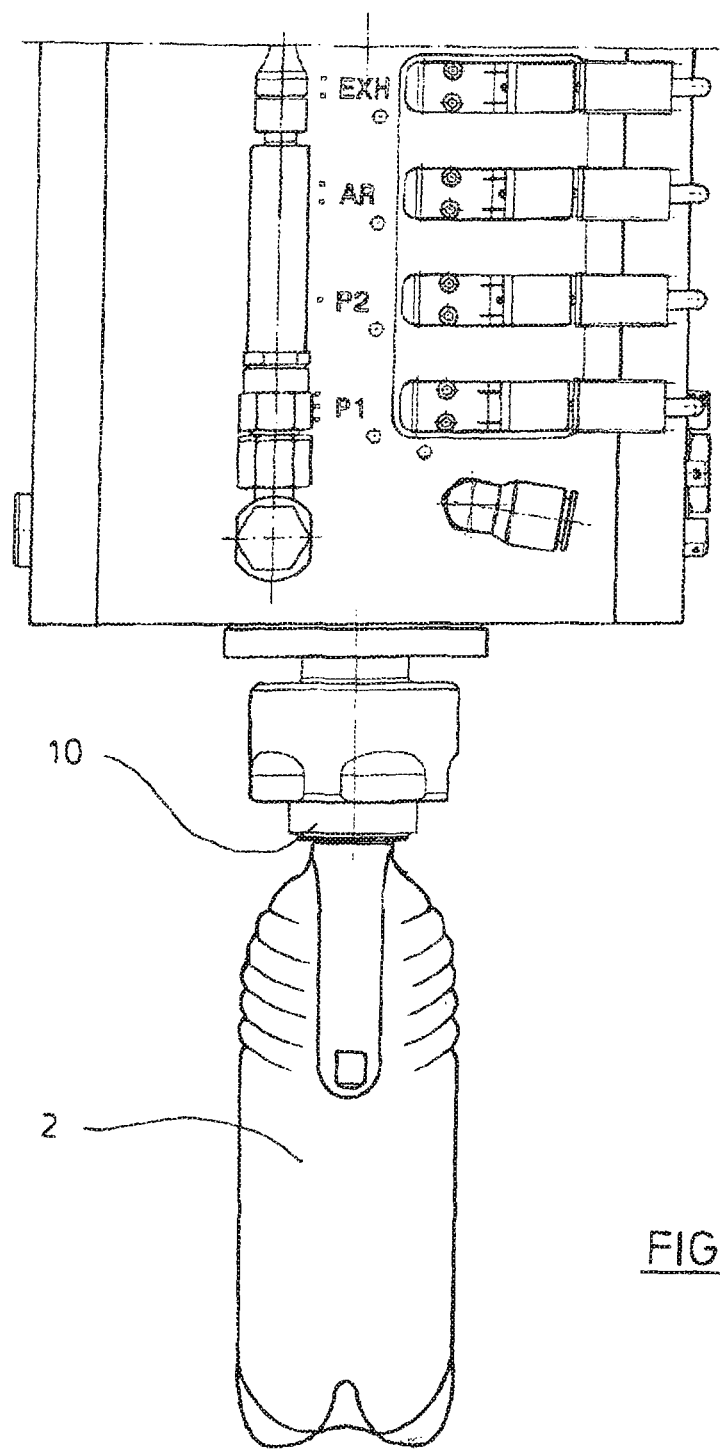
FIG. 2 shows a perspective view of a blowing station with the device for blow-molding containers from preforms, wherein the preform is shown positioned axially on the valve block after the blowing process, where diagrams illustrating the starting state of the preform prior to the blowing process and the container obtained after the blowing process are shown.

FIG. 2 shows schematically the blown container 2 and the preform 1, each with its mouth 6 held in the blowing nozzle seal 10.

Figure 3:
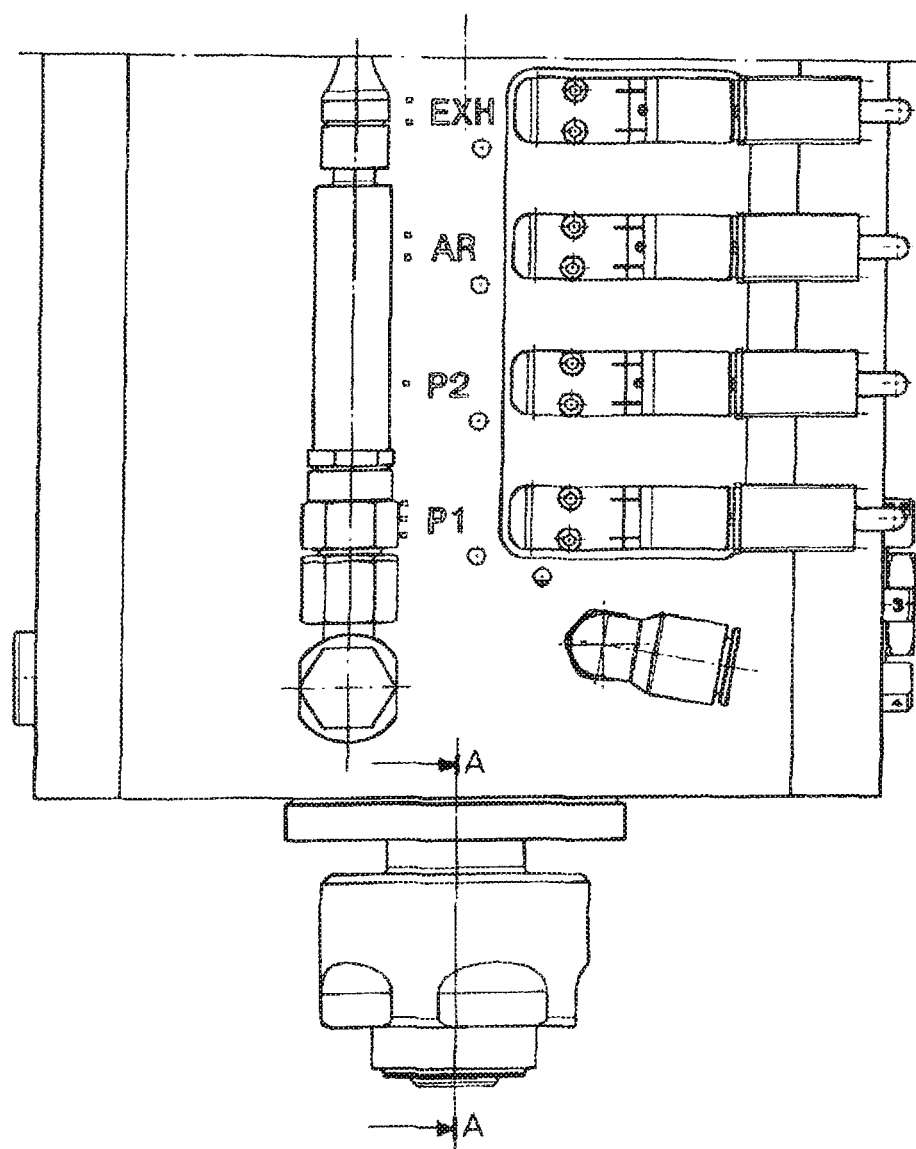
FIG. 3 shows a sketch of the situation of FIG. 1 without the preform.

FIG. 3 is a sketch of the situation according to FIG. 1 without the preform, showing the cross-sectional line A-A.

Figure 4:
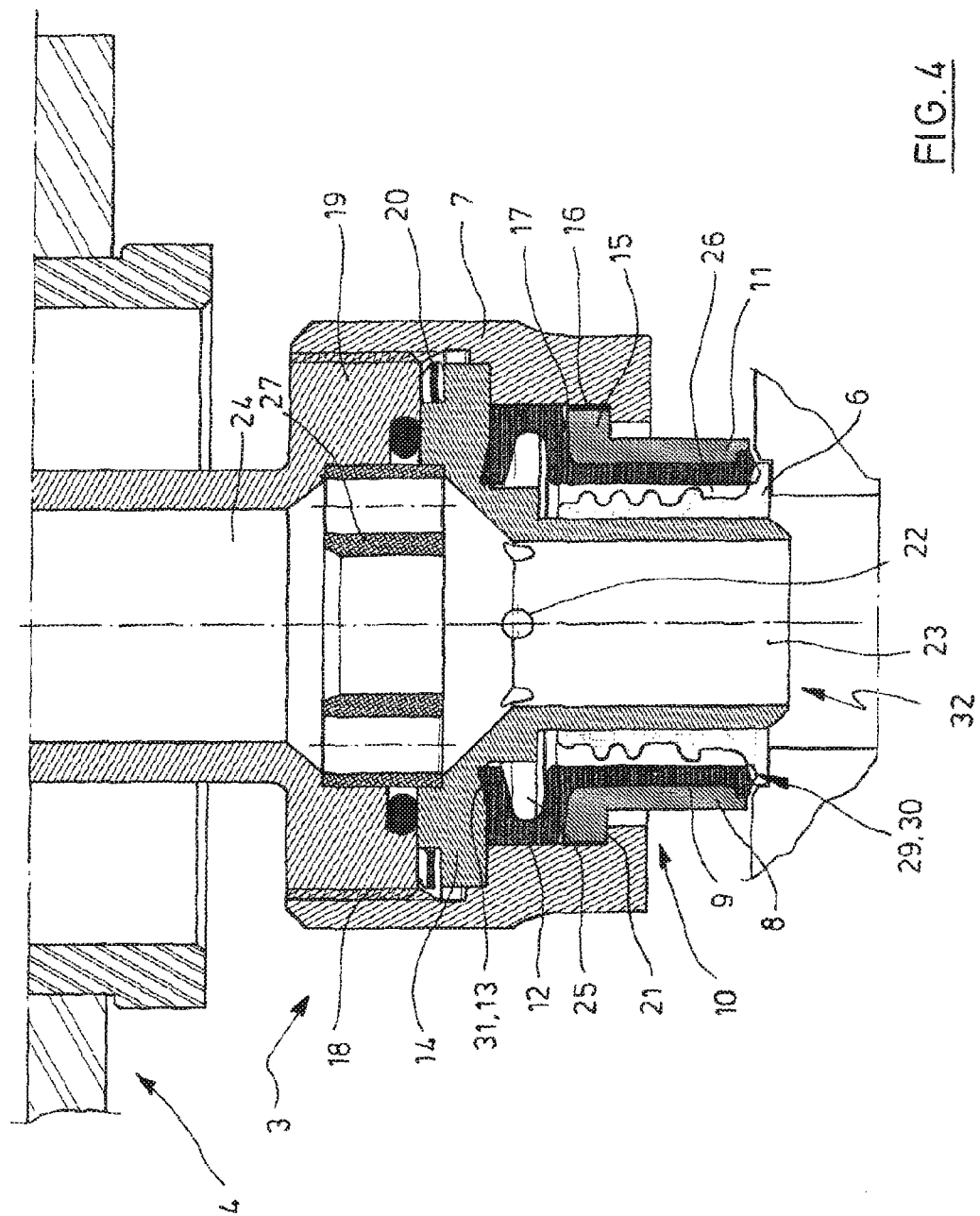
FIG. 4 represents an axial cross section A-A through the device according to the invention showing the mouth of a preform or container with its thread and support ring.

FIG. 4 shows the axial cross section A-A through the device 3 with the blowing nozzle 5 according to FIG. 3 with the schematically illustrated mouth 6 of the preform 1 or of the container 2. In the exemplary embodiment shown here, the outer element 7 is in the form of a coupling ring, comprising a radial stop shoulder 9 in the form of a projection extending in the axial direction provided for the support sleeve 8. The support sleeve 8 cooperates with the sealing element 9 to form the blowing nozzle seal 10.

What is shown is a preferred exemplary embodiment, in which the blowing nozzle seal 10 consists of a ready-to-install unit. This is achieved by the structural configuration of the support sleeve 8 and of the sealing element 9, in that a snap-in hook fastening 11 attaches the sealing element 9 to the support sleeve 8 after the two have been pushed into each other.

The sealing element 9 comprises at least one concavity 12, preferably at one end, with a sealing lip 13, the end surface of which rests on a contact surface 31 of the blowing nozzle insert 14 and forms a seal there. The sealing element 9 also has a preferably concentric sealing surface 29, located at the end, adapted to rest against the support ring 30 of the mouth 6 of the preform 1 or container 2.

The support sleeve 8 can be equipped with a terminal collar 15 and is guided in the external element 7 with a loose fit 16, so that the cavity 17 between the concavity 12 and the external element 7 is vented in particular to the surrounding space when the concavity is being deformed.

The loose fit 16 is dimensioned in such a way that the sealing element 9 is prevented from being extruded when the blowing pressure is applied. The collar 15 of the support sleeve 8 and its guidance on the external element 21 are configured in such a way that a common contact surface limits the axial extent of the blowing nozzle seal 10. What is shown is the situation under the action of the blowing pressure, so that the surfaces are resting against each other. When there is no pressure being applied, a certain gap can be present.

The concavity 12 is configured geometrically in such a way that, when pressure is applied to the space 25, a deformation occurs through expansion, which causes a stretching of the sealing element 9 axially toward the insertion opening 32, and as a result a pressing force develops at the contact between the sealing surfaces 29, 30.

The concavity 12 of the sealing element 9 is also configured in such a way that, when axial force acts on the sealing surface 29, it can deflect inward and thus automatically compensate for length tolerances of the adjacent components. A wave spring 20 provides axial pretension, which protects the thread 18 between the external element 7 and the blowing nozzle rod 19.

The blowing nozzle insert 14 is equipped with at least one through-bore 22, which connects the interior space 23 of the blowing nozzle insert 14 to the space 25 inside the concavity 12. As a result of this connection between the blowing pressure feed 24 and the space 23 of the blowing nozzle insert 14, the space 25, 26 is subjected to the blowing pressure by way of the at least one through-bore 22. The blowing nozzle rod 19 has a guide 27 for the stretching rod 28 (not shown in FIG. 4), which is arranged in the space of the blowing pressure feed 24.

The invention claimed is:

1. A device for blow-molding containers, comprising: a blowing nozzle head; and a blowing nozzle seal with a sealing surface at one end and a concavity, wherein the blowing nozzle seal and the blowing nozzle head are configured so that a space, in which pressure can be built up, is formed by contact of the sealing surface against a support ring of a mouth of a preform or container, wherein the blowing nozzle seal is formed by a sleeve-shaped sealing element and a support sleeve that surrounds the sealing element, wherein the support sleeve is movable inside the blowing nozzle head.

2. A device for blow-molding containers according to claim 1, wherein the sealing element comprises a snap-in hook fastening that cooperates with the support sleeve so that the sealing element is held in place inside the support sleeve.

3. A device for blow-molding containers according to claim 1, wherein the sealing element comprises a concavity that is configured geometrically so that a space open to the blowing nozzle head is surrounded.

4. A device for blow-molding containers according to claim 1, wherein the sealing element comprises a concavity that is configured geometrically so that the concavity is arranged at an end of the sealing element and comprises a sealing lip that has an end surface that rests against a contact surface on the blowing nozzle head.

5. A device for blow-molding containers according to claim 3, wherein the sealing element comprises a concavity that is configured geometrically so that, when pressure is applied to the space, a deformation occurs, which brings about a stretching of the sealing element axially toward an insertion opening of the container and as a result realizes pressing forces at a contact between the sealing surfaces.

6. A device for blow-molding containers according to claim 1, wherein the sealing element comprises a concavity that is configured geometrically so that, when axial force acts on the sealing surface, the sealing element deflects inward toward a contact surface of the blowing nozzle head.

7. A device for blow-molding containers according to claim 1, wherein the support sleeve comprises a collar.

8. A device for blow-molding containers according to claim 7, wherein the blowing nozzle head includes an external element, the collar being guided movably in the external element by a loose fit, and a cavity between the concavity and the external element is vented to surrounding space through the loose fit.

9. A device for blow-molding containers according to claim 8, wherein the loose fit is dimensioned so that an extrusion of the sealing element into the loose fit during action of the blowing pressure is prevented.

10. A device for blow-molding containers according to claim 1, wherein the blowing nozzle head comprises an external element and a blowing nozzle insert.

11. A device for blow-molding containers according to claim 10, wherein the blowing nozzle insert comprises at least one through-bore for connecting a blowing pressure feed of the blowing nozzle insert to the space.

12. A device for blow-molding containers according to claim 1, wherein the support sleeve is metal or plastic.

13. A device for blow-molding containers according to claim 1, wherein the sealing element is made of an elastomeric material.

14. A blowing air control block in a blowing station, comprising at least one device for blow-molding containers according to claim 1.

* * * * *